United States Patent [19]

Rollett et al.

[11] 3,895,309

[45] July 15, 1975

[54] SUB NETWORKS FOR FILTER LADDER NETWORKS

[75] Inventors: John Mortimer Rollett; David Richard Wise, both of London, England

[73] Assignee: The Post Office, London, England

[22] Filed: Jan. 10, 1974

[21] Appl. No.: 432,176

[30] Foreign Application Priority Data

Jan. 17, 1973 United Kingdom ................ 2482/73

[52] U.S. Cl. ................ 330/107; 330/109; 333/80 R

[51] Int. Cl. ................................................ H03f 1/36

[58] Field of Search ......... 330/12, 21, 31, 107, 109; 333/80 R, 80 T; 307/295; 328/167

[56] References Cited

UNITED STATES PATENTS

| | | | |
|---|---|---|---|
| 3,501,709 | 3/1970 | Uetrecht | 330/21 |
| 3,564,441 | 2/1971 | Eide | 330/109 X |
| 3,701,952 | 10/1972 | Miller et al. | 330/107 UX |

OTHER PUBLICATIONS

Kincaid et al., "Get Something Extra in Filter Design," Electronic Design 13, June 21, 1969 pp. 114-121.

Hogin, "Active Filters," Electronics World, Apr. 1969 pp. 58-60.

Handbook of Operational Amplifier Active RC Networks, Burr-Brown Research Corp., 1966 pp. 90, 91.

Antoniou, "Bandpass Transformation and Realization Using Frequency-Dependent Negative-Resistance Elements," IEEE Transactions On Circuit Theory, March 1971 pp. 297-98.

Pease, "Op. Amps and Feedback Capacitance," Electronic Engineering Feb. 1972 pp. 54, 56.

Bruton, "Network Transfer Functions Using the Concept of Frequency-Dependent Negative Resistance," IEE Transactions on Circuit Theory, August 1969 pp. 406-408.

*Primary Examiner*—James B. Mullins
*Attorney, Agent, or Firm*—Kemon, Palmer and Estabrook

[57] ABSTRACT

The invention concerns a subnetwork of a filter circuit which is useful for detecting the dialing tone used in a telephone system. The arrangement employs active devices such as operational amplifiers in circuit with passive resistive and capactive elements to simulate an inductance S. Although it is known to modify a gyrator circuit to produce a $1/s^2$ function it has hitherto been considered that the use of such simulated functions in a ladder filter network would produce an unstable arrangement. It has been found that the combination of a $1/s^2$ element in series with a simulated $1/s$ element is stable and suitable for use in ladder filter networks.

5 Claims, 14 Drawing Figures

SUB NETWORKS FOR FILTER LADDER NETWORKS

The invention relates to subnetworks for an active filter ladder network. Such networks use an inductor simulation technique employing a new resistive and capacitive components with active devices, such as amplifying elements, to avoid the use of inductive coils.

It is known to produce gyrator circuits which can be modified to give a substantially pure $1/s^2$ (or pure s, i.e., inductive) element. However, such circuits utilise more than one operational amplifier, generally an operational amplifier. Circuits providing $1/s^2$ elements are known, however, as it is also known that such elements are unstable, their use in ladder filter networks has not been pursued very far. Now a method has been found of utilising the properties of simulated $1/s^2$ elements in subnetworks suitable for stable use in a ladder filter network, such as a third order low-pass "pseudo-elliptic" filters.

It is an object of the present invention to provide a subnetwork having an input terminal and a reference terminal, which subnetwork is equivalent to a component having an impedance of the form $1/as^2$ in series or in parallel between said terminals with a component having an impedance of the form $1/sb$, where $a$ and $b$ are constants and $s$ is the complex frequency variable.

According to a first aspect of the invention there is provided a subnetwork, having an input terminal and a reference terminal, and including: an operational amplifier having substantially unity gain between an input and an output; a first and a second capacitor connected in series between the terminals of the subnetwork; and a resistor connected between the output of the amplifier and a junction point in the series path between the capacitors; the arrangement of the subnetwork being such as to be equivalent to a $1/s$ element in series with a $1/s^2$ element.

According to a second aspect of the invention there is provided a subnetwork having an input terminal and a reference terminal and including: an operational amplifier having substantially infinite gain between a signal input and a signal output terminal; a resistor connected in parallel between two capacitors in series between the signal input and signal output terminal of the amplifier; and the subnetwork input terminal being connected to the junction between the capacitors, and arranged so that the subnetwork is equivalent to a $1/s$ element in parallel with a $1/s^2$ element between said input and reference terminals.

According to a third aspect of the invention there is provided a subnetwork, having an input terminal and a reference terminal, and including: an operational amplifier having substantially unity gain between an input and an output; the input of said amplifier being coupled to the subnetwork reference terminal by way of a first capacitor and by way of a resistor to the network input terminal which is also coupled to the amplifier output by way of a second capacitor; the arrangement of the subnetwork being such that it is equivalent to a $1/s^2$ element in parallel with a $1/s$ element and the parallel combination being in series with a $1/s$ element between the subnetwork input and reference terminals.

According to a fourth aspect of the invention there is provided a subnetwork, having an input terminal and a reference terminal, and including: a differential input operational amplifier having an inverting signal input and a non-inverting signal input, and having a substantially infinite gain between said signal inputs and an output; to one input of said amplifier the input terminal of the subnetwork is coupled by way of a first capacitor; and the to other input of said amplifier the reference terminal of the subnetwork is coupled by way of a first resistor and a second capacitor in parallel, both of the differential inputs to said amplifier being directly connected to the amplifier output each by way of a second and a third resistor respectively, so that in operation the subnetwork is arranged to be equivalent to a $1/s$ element in parallel with a $1/s^2$ element.

According to a fifth aspect of the invention there is provided a subnetwork, having an input terminal and a reference terminal, and comprising: a differential input amplifier having an inverting signal input terminal and a non-inverting signal input terminal, and having substantially unity gain between the input terminals and an output terminal and having a high impedance input and low impedance output; one input of said amplifier being connected directly to the subnetwork input terminal; which said one input is also connected by way of a first capacitor to the amplifier output, said output of the amplifier being also connected by way of a second capacitor to the other input of the amplifier, said other input of amplifier being connected to the reference terminal by way of a first resistor.

According to a sixth aspect of the invention there is provided a subnetwork, having an input terminal and a reference terminal, and including: an amplifier having substantially unity gain between an input and an output, the input of which is directly connected to the input terminal; a first and a second capacitor in series between the input terminal and the reference terminal; and a feedback path from the output to the input of the amplifier and including a first resistor in parallel with a third capacitor connected between the junction between the first and the second capacitors and the amplifier output; the dimensioning of the first resistor and the third capacitor being such that in the feedback path there is an effective time constant substantially equal to the time constant associated with the amplifier in the fall-off region of its gain/frequency response, to extend the effective bandwith of the subnetwork which is arranged to the equivalent to a $1/s^2$ element in series with a $1/s$ element.

According to a seventh aspect of the invention there is provided a third order low-pass filter network including a subnetwork as defined in any of the preceeding paragraphs detailing the various aspects of the invention.

According to an eighth aspect of the invention there is provided a third order low-pass filter network including a subnetwork which is equivalent to a $1/s$ element in series or in parallel with a $1/s^2$ element, and in which the subnetwork includes an input terminal and a reference terminal, said filter network including an output amplifier having substantially unity gain and in which the subnetwork input terminal is connected to the filter network input by way of a first refistive element and a first capacitive element in series and wherein said subnetwork input terminal is connected by way of a second resistive element to the output amplifier input which is coupled to the reference terminal of the subnetwork by way of a second capacitive element, the filter network being such that in operation an input signal applied between the network input and the reference terminal is filtered by the network and the output signal is derived from the output of the output amplifier.

The invention will now be described, by way of example, with reference to the accompanying diagrammatic drawings in which:-

Figure 1:
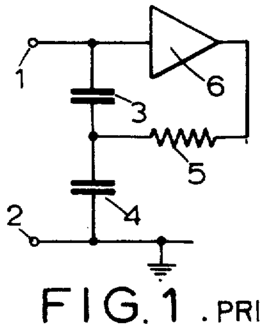
FIG. 1. PRIOR ART
FIG. 1 shows a first subnetwork embodying the invention.
Figure 2:
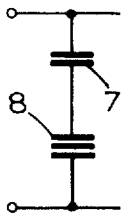
FIG. 2 shows the equivalent circuit of FIG. 1.

Referring now to FIG. 1 the first subnetwork comprises a pair of input terminals 1 and 2 across which is coupled a pair of capacitors 3 and 4 in series to the junction between which there is connected a resistor 5, the other side of which is connected to the output of an output amplifier 6. The input of the amplifier is connected directly to the terminal 1. FIG. 2 shows the equivalent network of FIG. 1 and comprises a $1/s$ element 7 in series with a $1/s^2$ element 8.

Figure 3:
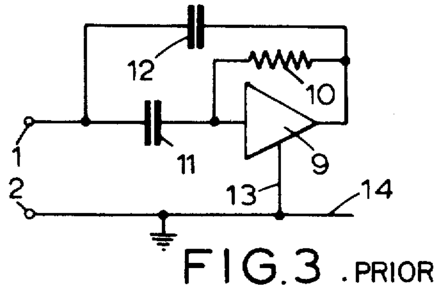
FIG. 3. PRIOR ART
FIG. 3 shows a second subnetwork embodying the invention.
Figure 4:
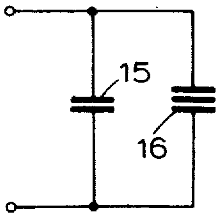
FIG. 4 shows the equivalent network of FIGS. 3 and 6.
Figure 7:
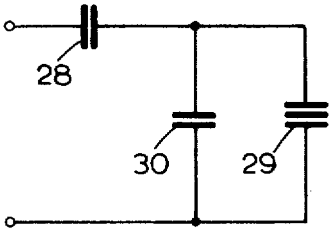
FIG. 7 shows the equivalent network of FIG. 5.
Figure 5:
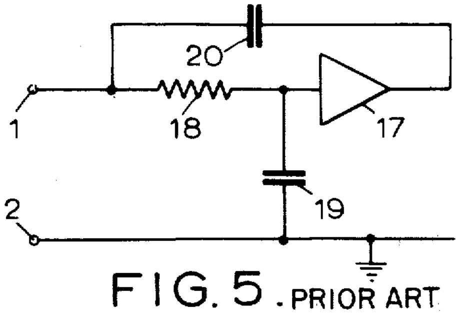
FIG. 5. PRIOR ART
FIG. 5 shows a third subnetwork embodying the invention.

The second subnetwork shown in FIG. 3 comprises an amplifier 9 having its input and output connected by way of a resistor 10. The input to the amplifier 9 is also connected to the subnetwork input terminal 1 by way of a capacitor 11. The terminal 1 is also connected to the output of the amplifier 9 by way of a capacitor 12. The signals applied to the amplifier 9 are referenced relative to earth by means of a coupling line 13 to the earthed supply line 14 connected to the terminal 2. The equivalent circuit to FIG. 3 as shown in FIG. 4 and comprises an $1/s$ element 15 in parallel with $1/s^2$ element 16. FIG. 5 shows a subnetwork which has an equivalent as shown in FIG. 7 and comprises an amplifier 17 connected to the input terminal 2 by way of a capacitor 19. The output from the amplifier 17 is also connected to the input terminal 1 by way of a capacitor 20. The equivalent network of the circuit of FIG. 5 is shown in FIG. 7 and comprises a $1/s$ element 28 connected in series with a $1/s^2$ element 29 which is also in parallel with a $1/s$ element 30.

Figure 6:
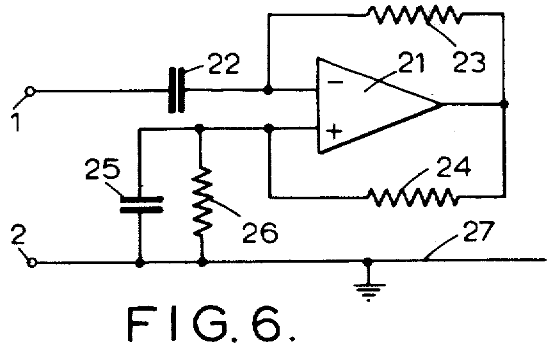
FIG. 6 shows a fourth subnetwork embodying the invention.

Referring now to FIG. 6 this subnetwork comprises a differential amplifier 21 one of the inputs of which is connected to the input terminal 1 by way of a capacitor 22 and to the output terminal of the amplifier by way of a resistor 23. The other input terminal to the amplifier 21 is connected to the output terminal by way of a resistor 24 and by way of a capacitor 25 and a resistor 26 in parallel to the earthed line 27 connected to the input terminal 2.

Referring again to the subnetwork shown in FIG. 1 and the equivalent network shown in FIG. 2, the input impedance $Z_{in}$ of this network is given by:

$$Z_{in} = \frac{(1/sC_1) + (1/sC_2) + (1/s^2C_1C_2R_3)}{1 + (1-k)\,(1/sC_2R_3)}$$

where: $C_1$ and $C_2$ are the values of capacitance of the capacitors 3 and 4 and $R_3$ is the resistance of the resistor 5; and assuming that the input impedance of the amplifier is sufficiently large to be negligible, the output impedance is sufficiently small to be negligible, and the voltage gain is $k$; $s$ is the complex frequency variable. If now the gain $k$ is exactly unity the input impedance is:

$$Z_{in} = (1/sC_1) + (1/sC_2) + (1/s^2C_1C_2R_3)$$

which has the general form $Z_d$ and as shown in FIG. 2 the equivalent network input impedance is given by:

$$Z_d = (1/sC_4) + (1/s^2M_5)$$

where: $C_4$ is the capacitance of the capacitor 7 and $M_5$ is the value of the $1/s^2$ element 8.

Figure 8:
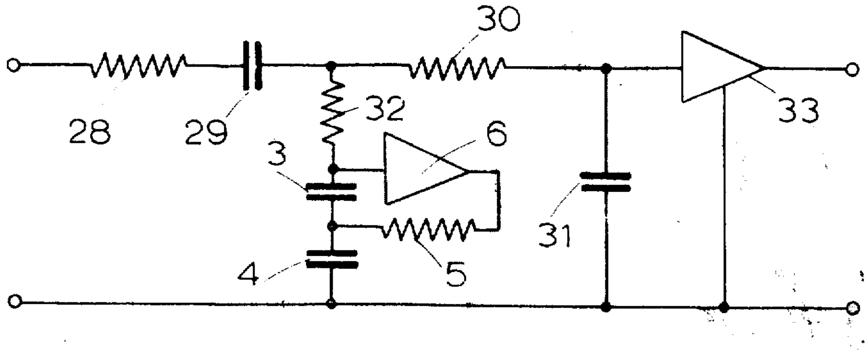
FIG. 8 shows a third order low-pass filter incorporating the subnetwork of FIG. 1.

One use of the subnetwork having impedances of the above general form is shown in FIG. 8. There are several particular properties of this network which make it especially useful in the construction of networks with low sensitivity. If the amplifier is not 'ideal' the changes in $Z_d$ caused by departures from the ideal are largely negligible. Thus, if the input capacitance is not negligible it can be absorbed into the term $C_4$, while if the output resistance is not negligible it can be absorbed into the resistance term $R_3$ which should be as small as convenient. Furthermore, if gain k departs slightly from unity and in practice it may lie within the range 1 to 0.99 the first order effects are simply to change the value of $C_4$ and $M_5$ slightly, and to introduce into the impedance $Z_d$ a small term in $1/s^3$ which is negligible.

Figure 9:
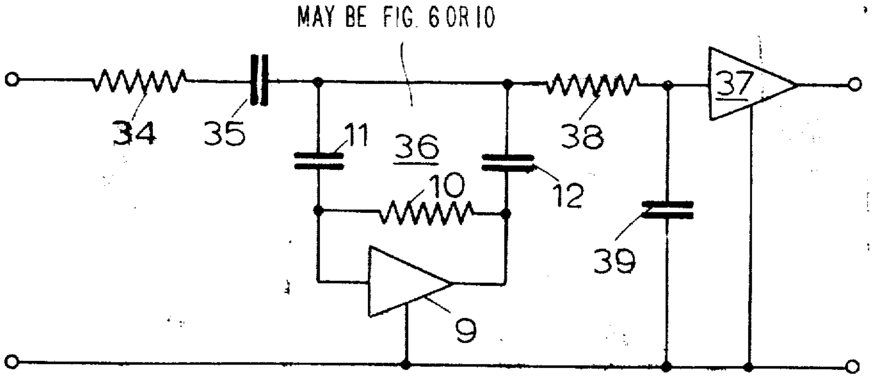
FIG. 9 shows another third order low-pass filter incorporating the subnetwork of FIG. 5.

In the subnetwork shown in FIG. 3 and the equivalent network of FIG. 4 the input admittance $Y_{in}$ of this network is given by:

$$Y_{in} = \frac{s/C_6 + C_7 + s^2C_6C_7R_3}{I + sC_6R_8/(1+A)}$$

where: $C_6$ and $C_7$ are the capacitances of the capacitors 11 and 12 and $R_8$ is the resistance of the resistor 10; and where it has been assumed that the input admittance and the output impedance are negligible and the voltage gain $-A$. If now the voltage gain is very large (i.e. negligibly different from infinity), the input admittance is:

$$Y_{in} = s(C_6 + C_7) + s^2C_6C_7R_8$$

which has the general form as related to FIG. 4 and is given by:

$$Y_e = sC_9 + s^2M_{10}$$

where: $C_9$ is the capacitance of the capacitor 15 and $M_{10}$ is the value of the element 16. A filter network employing a subnetwork having the general form of admittance as set out above is shown in FIG. 9.

The subnetwork of FIG. 3 like the subnetwork of FIG. 1 also has the property that the departure of the amplifier from the ideal has a largely negligible effect on the admittance $Y_e$ thus thus the first order effect of the gain A being finite (but still large) is to alter slightly the value of $C_9$ and $M_{10}$, and to add a small admittance proportional to $s^3$ which can be neglected. This network is therefore especially suited to the construction of networks with low sensitivity. The resistance $R_K$ of the resistor 10 should be made as large as convenient.

Referring now to FIG. 8 the filter network includes a subnetwork substantially as shown in FIG. 1 and is given the same reference numerals as in this figure the other elements included in FIG. 8 comprise an input resistor 28 and a capacitor 29 in series an output resistor 30 and a capacitor 31 in parallel a subnetwork input resistor 32 and an output amplifier 33. In operation the network of FIG. 8 acts as a third order low-pass 'pseudo-elliptic' filter which with the element values of TABLE 1 (below) has a passband ripple of 1dB, cut-off frequency of 3.40 kHz, and stop-band discrimination of 30 dB. With the element values of TABLE 2 (below) the above parameters are maintain except that the passband ripple of 1dB is now 0.1 dB.

TABLE 1

| | |
|---|---|
| Resistor 28 = 85.28 Kohms | Capacitor 29 = 1847 pF |
| Resistor 30 = 144.9 Kohms | Capacitor 3 = 12,220 pF |
| Resistor 32 = 20.00 Kohms | Capacitor 4 = 12,220 pF |
| Resistor 5 = 191.5 Kohms | Capacitor 31 = 468.1 pF |

TABLE 2

| | |
|---|---|
| Resistor 28 = 63.62 Kohms | Capacitor 29 = 1246 pF |
| Resistor 30 = 73.89 Kohms | Capacitor 3 = 11.95 nF |
| Resistor 32 = 10.52 Kohms | Capacitor 4 + 11.95 nF |
| Resistor 5 = 195.8 Kohms | Capacitor 31 = 468.1 pF |

Referring now to FIG. 9 which includes a subnetwork similar to that shown in FIG. 3 and is therefore given the same reference numerals as similar integers in FIG. 3 the filter also includes input resistor 34 and capacitor 35 feeding the network 36 and output resistor 38 and capacitor 39 feeding the amplifier 37.

The network of FIG. 9 acts as a third order low-pass Tchebychev filter, which with the element values of Table 3 has a pass band ripple of 1dB and cut-off frequency of 3.4 kHz.

TABLE 3

| | |
|---|---|
| Resistor 34 = 1.303 Kohms | Capacitor 35 = 133.86 nF |
| Resistor 24 = 144.3 Kohms | Capacitor 22 = 4.00 nF |
| Resistor 38 = 4.197 Kohms | Capacitor 23 = 4.00 nF |
| | Capacitor 39 = 20.0 nF |

Figure 10:
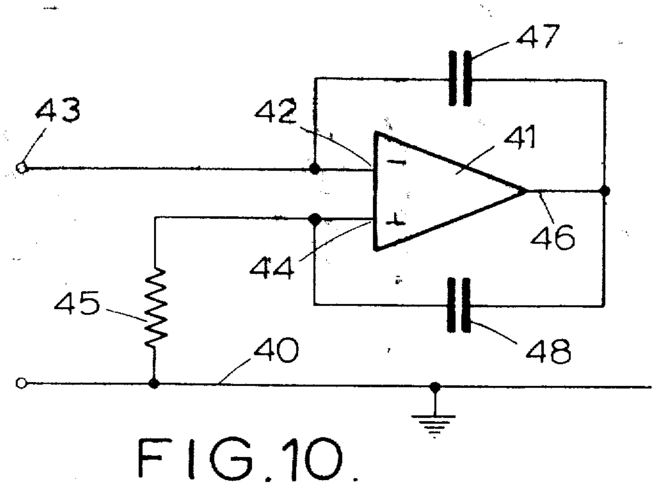
FIG. 10 shows a further subnetwork.

Referring now to FIG. 10, the subnetwork is connected to an earth line 40 and comprises a differential amplifier 41, of which the non-inverting input 42 is connected to an input terminal 43, and the inverting input terminal 44 is connected by way of a resistor 45 to earth. The output 46 of the amplifier 41 is connected by way of a first capacitor 47 to the input 42 and by way of a second capacitor 48 to the input 44. As shown in FIG. 2 the equivalent circuit comprises an impedance proportional to $1/s^2$ in series with a capacitance.

Assuming the resistor 45 has a resistive impedance equal to $R_1$ and the capacitors 47 and 48 have capacitive impedance proportional to $C_1$ and $C_2$ respectively, then the $1/s^2$ element 9 as shown in FIG. 2 has an impedance proportional to $C_1C_2R_1$. This element 8 is in series with a capacitor 7 having an impedance proportional to $C_1/2$. The differential amplifier 41 has a high input impedance and low output impedance and is arranged to provide unity gain i.e. the output signal is equal to the difference between the input signals. The impedance to ground measured from the terminal 43 is given by:-

$$Zin = \frac{1}{s^2C_1C_2R_1} + \frac{2}{sC_1}$$

Where:

$s$ is the complex frequency variable.

Figure 11:
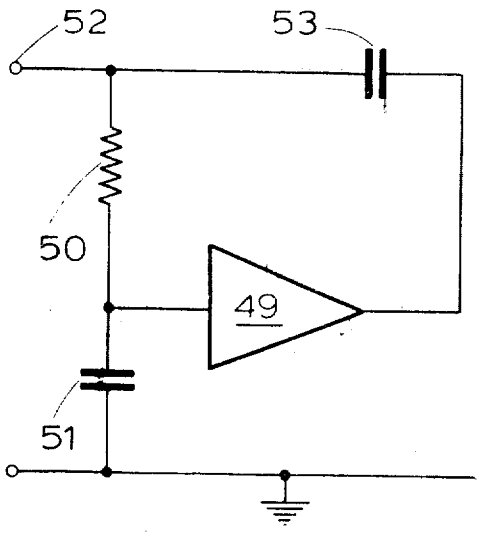
FIG. 11 shows a circuit similar in component configuration to that of FIG. 5.
Figure 12:
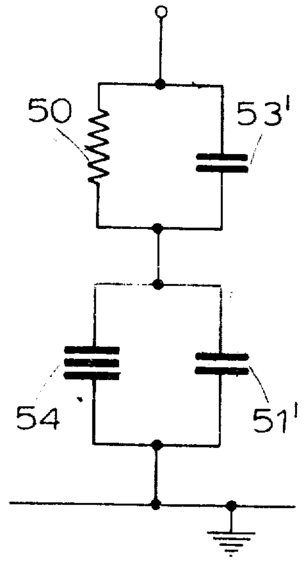
FIG. 12 shows the equivalent circuit of FIG. 11.

If the input terminals of the amplifier are interchanged, then the admittance to ground measured from terminal 43 is given by:

$$Yin = s^2R_1C_1C_2 + 2sC_1$$

which has the equivalent circuit shown in FIG. 4. Referring now to FIGS. 11 and 12 the subnetwork shown in FIG. 11 includes an amplifier 49 having unity gain, the input of which is connected to the junction between the a resistor 50 and a capacitor 51 connected in series between an input terminal 52 and earth. The output of the amplifier 49 is connected by way of a capacitor 53 to the input terminal 52.

Assuming that the elements of the circuits have the following impedance values:

Resistor 50 = $R_1$

Capacitor 53 = $C_1$

Capacitor 51 = $C_2$ then the circuit as shown in FIG. 12 includes a resistor 50 having a impedance proportional to the resistor 50 in parallel with a capacitor 53' having a capacitive impedance proportional to the capacitor 53 and an $1/s^2$ element 54 in parallel with a capacitor 51' having a capacitive impedance proportional to the capacitor 51. The $1/s^2$ element 54 has an impedance proportional to $C_1C_2R_1$. The amplifier 49 has a high input impedance and low output impedance and in the input frequency range where $(1/\omega C^1)^2$ is less than $R_1^2$. The circuit provides an equivalent circuit as shown in FIG. 12 comprising a $1/s$ element with a parasitic shunt capacitor in series with a further parasitic capacitor and a resistor. The impedance to ground measured from the terminal 52 is given by $$Zin = \frac{R_1}{1+sR_1C_1} + \frac{1}{sC_2+s^2C_1C_2R_1}$$

It will be appreciated that the circuit shown in FIG. 11 is similar in layout to that shown in FIG. 5 and described above however the equivalent circuit contains a resistive element in parallel with the input series capacitive element.

Figure 13:
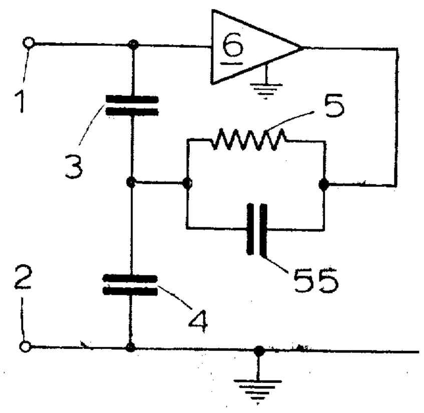
FIG. 13 shows a modified form of subnetwork shown in FIGS. 5 and 11.

Referring now to FIG. 13 it will be noted that this Figure is similar to FIG. 1 with the addition of a capacitor 55 in parallel with the resistor 5. The other components are given the same reference numerals as in FIG. 1. It will be noted that with the addition of this further capacitor from the output of the amplifier 6 to the junction between the capacitors 3 and 4 the equivalent circuit, shown in FIG. 14, differs considerably from the equivalent circuit shown in FIG. 2 if the components in FIG. 13 are proportioned in a predetermined way which will now be described.

The admittance of the circuit of FIG. 1 is given by:-

$$Y_{in} = \frac{s^2C_1C_2 + (1-k)\,sC_1G_3}{s(C_1 + C_2) + G_3}$$

where $k$ is the actual gain of the amplifier 6. It is evident that if $k$ is substantially equal to unity, the input impedance has the required form and consists of a capacitance in series with the impedance proportional to $1/s^2$.

In practice k is frequency dependent. For amplifiers having a single dominant pole, with unity gain frequency given by:

$$s_1 = 1/T_1$$

the frequency dependence can be represented by the expression $$(1/k) = 1 + (1/K_o) + sT_1$$

where $K_o$ is the low-frequency open-loop gain of the amplifier, normally of the order $10^4$. The second term in the numerator can thus be written $$k((1/K_o) + sT_1)sC_1G_3$$

The circuit shown in FIG. 13 is obtained by replacing $G_3$ by a parallel combination of the capacitor 55 having a capacitance $C_{55}$ and the resistor 5 having a resistance $R_5$ as shown in FIG. 13, where:

$$G_5 + SC_4 = G_5\,(1/k)/(1+(1/K_o))$$
$$= G\,(1+sT_1/(1+(1/K_o)))$$

The second term of this becomes $$[(1/K_o) + sT_1)]\;sC_1G_5/[1+(1/K_o)]$$
$$= s^2C_1C_4 + sC_1G_5/(1+k_o)$$

The numerator of $Y_{in}$ is now given by $$s^2C_1(C_2 + C_4) + sC_1G_5/(1+K_o)$$

The only "non-wanted" term is the term involving $K_o$, and since $K_o$ is often of the order of $10^4$ or $10^5$ for readily available amplifiers, this term is negligible for practical purposes. Furthermore its effect decreases as the frequency increases, in contrast with the discrepancies with arise in the uncompencated circuit as shown in FIG. 1.

The impedance of FIG. 13 is therefore given for practical purposes, by:

$$Z_{in} = \frac{(C_1 + C_2 + C_4)}{s_1C_2\,(C_2 + C_4)} + \frac{1}{s^2(C_1\,(C_2 + C_4)\,R_5}$$

Figure 14:
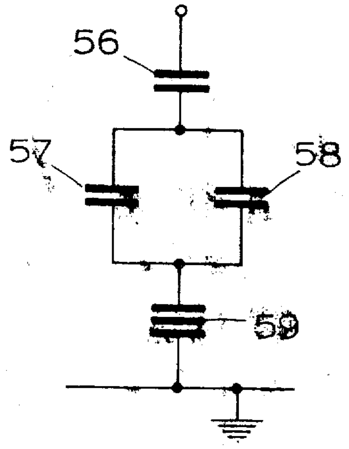
FIG. 14 shows the equivalent circuit of FIG. 13.

That is, as shown in FIG. 14, a capacitor 36 having a capacitance $C_1$ equal to the capacitor 3 in series with the parallel combination with two capacitors 57 and 58 having capacitancies $C_2$ $C_{55}$ equal to the capacitancies of the capacitors 4 and 55 respectively, in series with a "$1/s^2$" element 59 having a value equal to $C_1$ ($C_2$ + $C_{55}$) $R_5$.

This result holds in practice over the frequency range where the amplifier gain is following a single-dominant pole behaviour at frequencies substantially above the pole frequency, in other words the range where the gain is falling off at 6dB per octave. For readily available intergrated circuit operational amplifiers, this range usually extends from 100Hz to 100kHz, the pole frequency being of the order of 5Hz and the unity-gain frequency being of the order of 1MHz the result is achieved, by arranging for the time constant of the parallel combination of the resistor 5 and the capacitor 55 to equal the effective time constant associated with the 6dB per octave fall-off region in the gain-frequency response of the amplifier, i.e. where:-

$$R_5C_4 = T_1/(1+(1/K_o))$$
$$= T_1$$

The circuit of FIG. 13 allows a cheap amplifier of moderate band-width to be used in a precision filter circuit where otherwise a more expensive amplifier of wide bandwidth would be required, especially in the higher frequency range of frequencies from 100Hz to 100kHz. The circuit may be used to detect the audio frequency tones used in a telephone system to transmit the dialling digits.

I claim:

1. A subnetwork having a input/output terminal and a reference terminal and comprising a differential input amplifier having an inverting signal input and a non-inverting signal input, and having substantially unity gain between the signal input and an output and having a high impedance input and low impedance output; said inverting signal input of said amplifier being connected directly to the subnetwork input/output terminal; which said inverting signal input is also connected by way of a first capacitor to the amplifier output, said output of the amplifier being also connected by way of a second capacitor to said non-inverting signal input of the amplifier, said non-inverting signal input of the amplifier being connected to the reference terminal by way of a first resistor, so that in operation the subnetwork is arranged to be equivalent to a $1/s$ element in series with a $1/s^2$ element, effective between the input/output terminal and the reference terminal.

2. A third order low-pass filter network including a subnetwork as claimed in claim 1, said filter network including an output amplifier having substantially unity gain and in which the subnetwork input/output terminal is connected to the filter network input by way of a first resistive element and a first capacitive element in series and wherein said subnetwork input/output terminal is connected by way of a second resistive element to the output amplifier input which is coupled to the reference terminal of the subnetwork by way of a second capacitive element, the filter network being such that in operation an input signal applied between the network input and the reference terminal is filtered by the network and the output signal is derived from the output to the output amplifier.

3. A subnetwork, having an input/output terminal and a reference terminal, and including: an amplifier having substantially unity gain between a signal input and an output, the signal input of which is directly connected to the input/output terminal; a first and a second capacitor in series between the input/output terminal and the reference terminal; and a feedback path from the output to the signal input of the amplifier and including a first resistor in parallel with a third capacitor connected between the junction between the first and the second capacitors and the amplifier output; the dimensioning of the first resistor and the third capacitor being such that in the feedback path there is an effective time constant substantially equal to the time constant associated with the amplifier in the fall-off region of its gain/frequency response, to extend the effective bandwidth of the subnetwork which is arranged to be equivalent to a $1/s^2$ element in series with two parallel $1/s$ elements in series with a $1/s$ element, effective between the input/output terminal and the reference terminal.

4. A subnetwork, having an input/output terminal and a reference terminal, and including: a differential input operational amplifier having an inverting signal input and a non-inverting signal input, and having a substantially infinite gain between said signal inputs and an output; to said inverting signal input of said amplifier the input/output terminal of the subnetwork is coupled by way of a first capacitor; and to said non-inverting signal input of said amplifier the reference terminal of the subnetwork is coupled by way of a first resistor and a second capacitor in parallel, both of the differential inputs to said amplifier being directly connected to the amplifier output each by way of a second and a third resistor respectively, so that in operation the subnetwork is arranged to be equivalent to a $1/s$ element in parallel with a $1/s^2$ element, effective between the input/output terminal and the reference terminal.

5. A third order low-pass filter network including a subnetwork as claimed in claim 4, said filter network including an output amplifier having substantially unity gain and in which the subnetwork input/output terminal is connected to the filter network input by way of a first resistive element and a first capacitive element in series and wherein said subnetwork input/output terminal is connected by way of a second resistive element to the output amplifier input which is coupled to the reference terminal of the subnetwork by way of a second capacitive element, the filter network being such that in operation an input signal applied between the network input and the reference terminal is filtered by the network and the output signal is derived from the output to the output amplifer.

* * * * *